United States Patent

[11] 3,633,189

[72] Inventor Shahbuddin A. Billawala
Thousand Oaks, Calif.

[21] Appl. No. 860,477
[22] Filed Sept. 24, 1969
[45] Patented Jan. 4, 1972
[73] Assignee Burroughs Corporation
Detroit, Mich.

[54] CABLE STRUCTURE FOR MAGNETIC HEAD ASSEMBLY
19 Claims, 7 Drawing Figs.

[52] U.S. Cl. .......... 340/174.1 F, 174/117 FF, 339/17 F
[51] Int. Cl. .......... G11b 5/12, H01b 7/08, H05k 1/18
[50] Field of Search .......... 174/68.5, 117 F, 117 FF, 117 PC; 317/101 B, 101 C; 339/17 F, 176 MF; 340/174.1 F

[56] References Cited

UNITED STATES PATENTS

| | | | |
|---|---|---|---|
| 2,946,877 | 7/1960 | Nalette et al. ................ | 339/17 F |
| 3,229,268 | 1/1966 | Solyst .......................... | 340/174.1 F |
| 3,462,542 | 8/1969 | Richter ......................... | 339/17 F |

*Primary Examiner*—Bernard Konick
*Assistant Examiner*—J. Russell Goudeau
*Attorney*—Christie, Parker & Hale

ABSTRACT: An elongated flat strip of insulative material having at one end a central portion, lateral portions disposed on either side of the central portion, and transverse portions joining the lateral portions to the central portion. The central portion protrudes further than the lateral portions. Wire-connecting pads are concentrated in a line across the central portion and the lateral portions. Conductors are arranged along the length of the strip. The ends of the conductors terminate respectively at the different pads. The conductors terminating at the pads on the lateral portions are mounted along the outer edges of the strip and the conductors terminating at the pads on the central portion are arranged along the center of the strip. As a result, the conductors lead to each portion without passing the pads on the other portions. Each transverse portion has a double-reverse bend that places the pads on the lateral portions in a row stepped back from and beside the row of pads on the central portion. The end of the strip lies in a recess in a magnetic head assembly. The head windings are directly connected to the pads.

FIG. 3
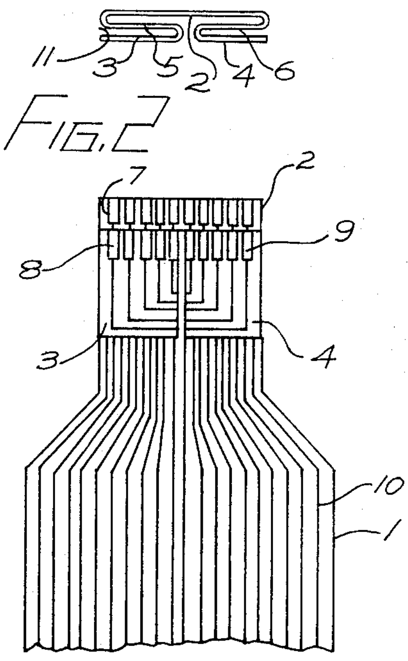
FIG. 3, FIG. 2
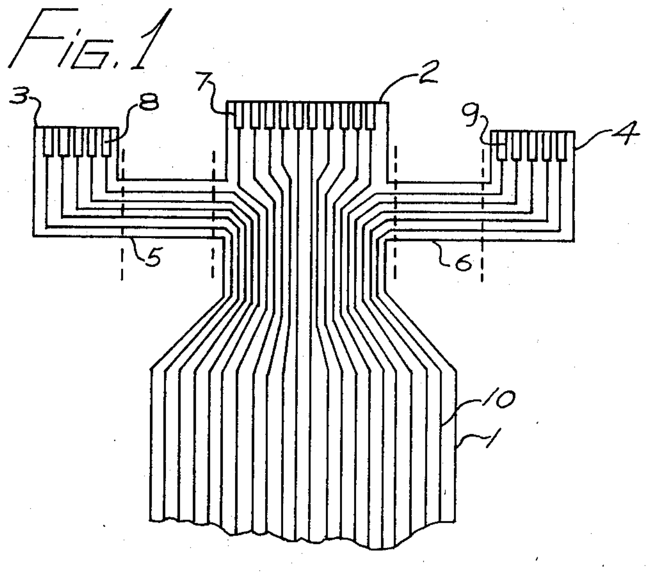
FIG. 1
FIG. 6
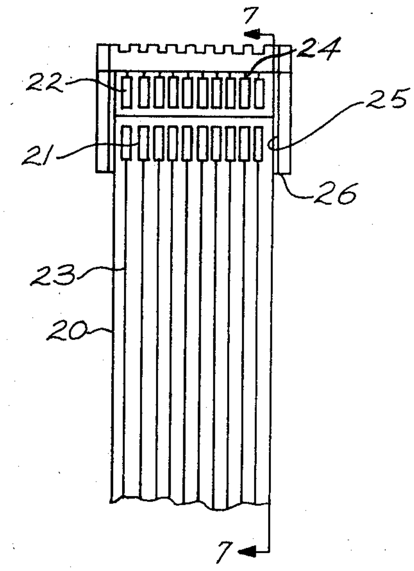
FIG. 7
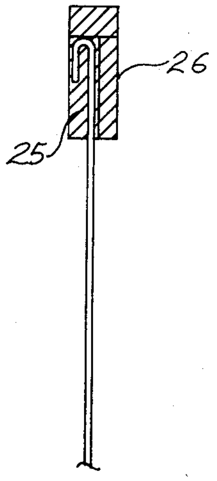
INVENTOR.
SHAHBUDDIN A. BILLAWALA
BY
Christie, Parker & Hale
ATTORNEYS

CABLE STRUCTURE FOR MAGNETIC HEAD ASSEMBLY

BACKGROUND OF THE INVENTION

The invention relates to compact cable design and, more particularly, to a cable structure that has a large number of wire connecting pads concentrated in a small area. The cable structure is especially well suited for connection to the head windings of a magnetic head assembly.

Conventionally, a cable is electrically connected to circuit components or modules by a connector having male and female members that can be taken apart. However, there are many situations in which the expense of such a connector is not justified because the electrical connection between the cable and the component will never or rarely be severed under normal conditions. In this case, permanent solder connections are generally made between the conductors of the cable and the component.

Following printed circuit techniques, it has become a common practice to construct electrical cables by forming conductors along the length of an elongated flat flexible strip of insulative material. If permanent solder connections are to be made from the cable to an electrical component, wire connecting pads are usually provided for this purpose. The pads must be wider than the conductors to provide sufficient space to form a solder connection. Consequently, the pads occupy much more space than is, by normal arranging practice, available at the end of the cable.

The problem is particularly acute in the construction of a cable for magnetic head assemblies similar to those shown in the disc file unit of U.S. Pat. No. 3,310,792, which issued on March 21, 1967, in the name of R. G. Groom et al. In such an assembly there are many magnetic heads that must be individually connected by wires to the pads of the cable. Inefficient arrangement of the pads drastically increases the space requirements for the head assemblies. In the disc file unit of U.S. Pat. 3,310,792, the required space is furnished by a printed circuit board that contributes substantially to the overall size of the assembly and the fabrication costs thereof. One set of connections is provided between the individual head windings and the circuit board, and another set of connections is provided between the circuit board and the cable.

SUMMARY OF THE INVENTION

The invention contemplates a cable structure having an elongated flat strip of insulative material with at least two portions at one end that are bent relative to each other to lie in spaced apart planes. Wire connecting pads are concentrated on the two portions of the strip. Preferably, the planes are staggered so all the pads are exposed. A plurality of conductors are arranged in one plane along the length of the strip, the ends of the conductors terminating respectively in two or more spaced apart planes at the pads such that the conductors lead to each portion without passing the pads on the other portion.

Preferably, the strip of insulative material has three portions at the one end, a central portion and lateral portions disposed on either side of the central portion. The central portion protrudes further than the lateral portions, which are connected to the central portion transverse portions. The central portion and the lateral portions each have a row of pads concentrated on them. The conductors leading to the pads on the lateral portions extend along edges of the length of the strip and the conductors leading to the pads on the central portion extend along the center of the length of the strip. The transverse portions have double-reverse bends arranged so the rows of pads on the lateral portions are aside of and stepped back from the row of pads on the central portion. Consequently, all the pads are exposed although they are concentrated in a small area. The end of the strip is bonded into a rectangular recess in the circuit component to which the electrical connections are to be established.

The invention is of considerably importance because it permits a much larger number of connecting pads to be concentrated within a small area at the end of a cable than has heretofore been possible. Thus, all the connecting pads can ordinarily be formed as an integral part of the end of the cable itself. In the case of a printed circuit cable, the pads can be formed by printed circuit techniques at the same time that the conductors of the cable are fabricated.

The invention is particularly advantageous in connection with a magnetic head assembly of the type disclosed in the above-identified patent. The end of the cable with the pads extends into the head assembly where it lies in a recess. The individual head windings are directly connected to the pads so all the leads, i.e., the connections remain substantially within the confines of the head assembly. No printed circuit board is required to make the connections between the head windings and the cable. Thus, the space that the head assembly occupies is drastically reduced, the fabrication costs are cut, and reliability is enhanced because one set of connections is eliminated.

BRIEF DESCRIPTION OF THE DRAWINGS

The features of specific embodiments of the best mode contemplated of carrying out the invention is illustrated in the drawings, in which:

FIG. 1 is a top plan view of the end of one embodiment of a cable structure laid out flat;

FIG. 2 is a top plan view of the embodiment of FIG. 1 after the end of the cable is bent into a rectangular configuration;

FIG. 3 is a back elevation view of the bent cable shown in FIG. 2;

FIG. 6 is a top plan view of another embodiment of a cable structure in a circuit component; and FIG. 7 is a side elevation view is section of the embodiment of FIG. 6.

DETAILED DESCRIPTION OF THE SPECIFIC EMBODIMENTS

Figure 4:
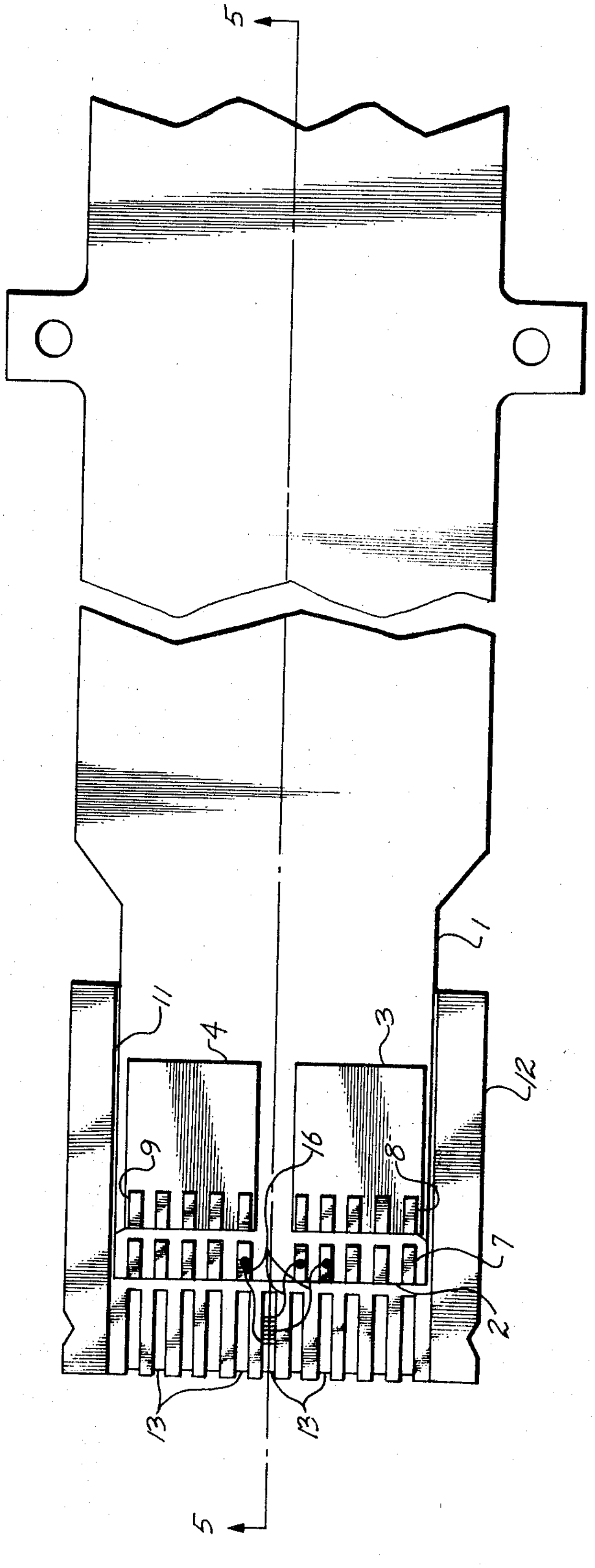
FIG. 4 is a top plan view of the bent cable mounted in a recess in a circuit component.

Reference is made to FIG. 1, in which an elongated flat strip of insulative material 1 is shown. At one end, strip 1 has a central portion 2 and lateral portions 3 and 4. Central portion 2 protrudes further than lateral portions 3 and 4. Lateral portion 3 is joined to the remainder of strip 1 by a transverse portion 5. Lateral portion 4 is joined to the remainder of strip 1 by a transverse portion 6. Rows of wire-connecting pads 7, 8 and 9 are concentrated on portions 2, 3 and 4, respectively. Rows 7, 8, and 9 extend across their respective portions. A plurality of conductors 10 are disposed in one plane along the length of strip 1. Those of conductors 10 lying on one side of strip 1 lead across transverse portion 5 to the individual pads of row 8. Those of conductors 10 lying on the other side of strip 1 lead across transverse portion 6 to the individual pads of row 9. Those of conductors 10 lying in the middle of strip 1 lead directly to the individual pads of row 7. Thus, conductors 10 lead respectively to portions 2, 3, and 4 without passing any of the pads mounted on the other portions or crossing each other.

Rows 7, 8, and 9, and conductors 10 are formed on the surface of strip 1 by conventional printed circuit techniques from a layer of copper or other good conductor deposited of bonded on the surface of strip 1. The cable could be made in the following way: a thin layer of copper is bonded with epoxy to a thin layer of polyamide film or Teflon film; the pads and conductors are formed in the copper by etching; and a thin layer of Teflon film or polyamide film or polyester film is bonded to the copper with epoxy so the copper is completely covered in the area of the pads. The resulting cable is thin enough to be quite flexible, e.g., about 4 mils. To finish the end of the cable, transverse portions 5 and 6 are bent along the dotted lines indicated in FIG. 1. Thus, transverse portions 5 and 6 have double-reverse bends (FIG. 3) that place rows of pads 8 and 9 in alignment adjacent to and stepped back from rows of pads 7 (FIG. 2). In other words, portions 3 and 4 lie in a plane that is staggered relative to the plane in which portion 2 lies. As depicted in FIGS. 2 and 3, the end of the bent cable has a rectangular shape.

Figure 5:
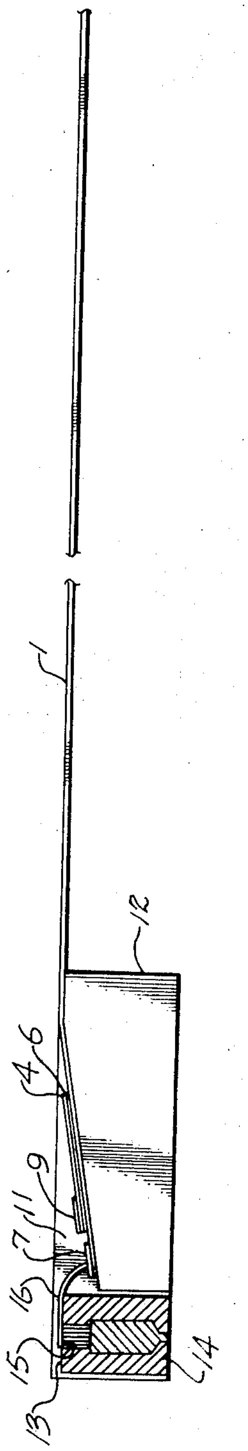
FIG. 5 is a side elevation view in section of the cable and circuit component shown in FIG. 4.

Reference is made to FIGS. 4 and 5 for the cable of FIGS. 2 and 3 as it is used with a magnetic head assembly. The bent cable is placed into a wedge-shaped recess 11 of a magnetic head assembly 12, where it is bonded to assembly 12. The end of assembly 12 has a number of slots 13 in which magnetic cores, such as that shown at 14 in FIG. 5, are disposed. Each core has a head winding 15, with a plurality of insulated leads 16. Each of leads 16 is soldered to a different pad on the end of cable 1. After the solder connections are made to the pads, they are coated with a solder resist or other insulative material. For clarity, FIG. 4 shows only one head winding with its associated leads, it being understood that the leads of the other head windings would be similarly soldered to the other pads at the end of cable 1. All the leads connecting the head windings of the assembly to the cable lie substantially within the confines of the assembly itself. A small, reliable, and relatively easily fabricated package results.

In FIGS. 6 and 7 an alternative embodiment is shown. An elongated flat strip of insulative material 20 has at one end a row of wire connecting pads 21 on one side and a row of wire-connecting pads 22 on the other side. The end of strip 20 has a single-reverse bend that produces two portions lying in spaced apart, staggered planes. Conductors 23 extend along the length of strip 20 on the one side to the individual pads of row 21, and conductors 24 which are only partially visible in FIG. 4, extend along the length of the other side of strip 20 to the individual pads of row 22. The end of strip 20 is bonded into a recess 25 of a circuit component 26. Thus, row 22 lies adjacent to and stepped from row 21. The cable of FIGS. 4 and 5 is not as flexible as the cable of FIGS. 1 through 3 because printed circuits are formed on both sides of strip 20.

In either embodiment, it would be possible to arrange one row of pads directly over the other row of pads instead of being staggered. In such case, access is gained to the lower row of pads by making the portion of the cable on which the upper row of pads is disposed a flexible flap that may be bent back. After the connections are made to the lower row of pads, the flap is bent forward once again to lie over the lower row of pads and is bonded in this position. The connections from pads 21 and 22 to head windings, although not illustrated, are the same as FIGS. 4 and 5.

I claim:

1. Apparatus comprising:

a magnetic head assembly having a plurality of magnetic transducer heads including head windings, a recess being formed in the head assembly;

a cable structure for coupling electrical signals to and from the head windings, the cable structure having an elongated, flat strip of insulative material with at least two portions at one end that are bent relative to each other to lie in spaced-apart planes, a plurality of wire connecting pads concentrated on each of the portions, and a plurality of conductors arranged along the length of the strip, the ends of the conductors terminating respectively at the individual pads such that the respective conductors lead to each portion without passing the pads on the other portion;

electrical connections between the head windings and individual pads; and the one end of the flat strip being disposed in the recess of the head assembly so that the electrical connections between the head windings and the individual pads lie substantially within the recess, the one end of the strip being bonded to the head assembly.

2. The apparatus of claim 1, in which the one end of the strip has a central portion, lateral portions disposed on either side of the central portion, and transverse portions connecting the lateral portions to the remainder of the strip, the central portion protrudes further than the lateral portions, the transverse portions have double reverse bends that place the lateral portions in a spaced-apart plane staggered from the central portion, and the plurality of pads are arranged on the central and lateral portions such that the pads on the central portion protrude beyond the pads on the lateral portions.

3. The apparatus of claim 1, in which one plurality of pads are arranged on one side of the strip spaced back from the end of the strip, the other plurality of pads are arranged on the other side of the strip along the end of the strip, the conductors terminating at the one plurality of pads are arranged on the one side of the strip, the conductors terminating at the other plurality of pads are arranged on the other side of the strip, and the end of the strip has a single reverse bend that places the other plurality of pads adjacent to and stepped back from the one plurality of pads so all the pads are exposed.

4. The apparatus of claim 1, in which each plurality of pads is arranged in a substantially straight row extending across the respective portion, the rows of pads being parallel to each other.

5. The apparatus of claim 1, in which the recess in the head assembly and the one end of the strip are both rectangular, the plurality of pads concentrated on both of the portions lying along one surface of the rectangular shaped one end of the strip.

6. A cable structure comprising:

an elongated flat strip of insulative material having at one end a central portion, a lateral portion disposed on one side of the central portion, and a transverse portion connecting the lateral portion to the remainder of the strip, the transverse portion having a double-reverse bend arranged such that the lateral portion lies in a plane spaced from the central portion; and a circuit pattern of conductive material supported by the strip, the pattern including a first plurality of wire connecting pads arranged in a row across the central portion, a second plurality of wire connecting pads arranged in a row across the lateral portion, and a plurality of elongated paths extending along the length of the strip, the ends of the paths terminating respectively at the individual pads.

7. The cable structure of claim 6, in which the central portion protrudes further than the lateral portion and the first plurality of pads are arranged across the protruding area of the central portion.

8. The cable structure of claim 6, additionally comprising another lateral portion disposed on the other side of the central portion, another transverse portion connecting the other lateral portion to the remainder of the strip, the other transverse portion having a double reverse bend arranged such that the other lateral portion lies in a plane spaced from the central portion, and a third plurality of pads included in the circuit pattern on the other lateral portion, the third plurality of pads forming the termination for the ends of respective paths extending along the length of the strip.

9. The cable structure of claim 8, in which the double-reverse bends in the transverse portions are arranged such that the lateral portions lie in the same plane.

10. The cable structure of claim 8, in which the paths leading to the pads on the lateral portions are arranged along the edges of the strip and the paths leading to the pads on the central portion are arranged along the center of the strips such that the paths lead to the respective pads without crossing one another.

11. The cable structure of claim 10, in which the paths leading to the pads on the lateral portions extend across the transverse portions to their respective pads in a direction transverse to the direction of the paths along the length of the strip.

12. A cable structure comprising:

an elongated flat strip of insulative material having at one end at least two portions that are bent relative to each other to lie in spaced apart planes;

a first plurality of wire connecting pads concentrated on one side of the one portion;

a second plurality of wire connecting pads concentrated on the said one side of the other portion; and a plurality of conductors arranged in a single plane along the length of the strip, the ends of at least some of the conductors leaving the single plane to terminate respectively at the individual pads such that the respective conductors lead to each portion without passing the pads on the other portion.

13. The cable structure of claim 12, in which the first plurality of pads are arranged in a row extending across the one portion and the second plurality of pads are arranged in a row extending across the other portion adjacent to the first plurality of pads.

14. The cable structure of claim 12, in which the first and second plurality of pads are staggered with respect to each other so all the pads are exposed.

15. The cable structure of claim 12, in which the first plurality of pads are stepped back from and beside the second plurality of pads.

16. The cable structure of claim 12, in which the one end of the strip has a central portion, lateral portions disposed on either side of the central portion, and transverse portions connecting the lateral portions to the remainder of the strip, the central portion protrudes further than the lateral portions, the transverse portions have double-reverse bends that place the lateral portions in a spaced-apart plane staggered from the central portion, the first plurality of pads are arranged on the lateral portions, and the second plurality of pads are arranged on the central portion so they protrude beyond the first plurality and lie in the single plane.

17. The cable structure of claim 16, in which the conductors terminating at the pads on the lateral portions are arranged along the edges of the length of the strip and the conductors terminating at the pads on the central portion are arranged along the center of the length of the strip such that each conductor leads to its pad without passing any of the pads mounted on the other portions.

18. The cable structure of claim 17, in which a circuit component is provided having a recess and the one end of the strip is bonded into the recess.

19. The cable structure of claim 17, in which the central portion, the lateral portions and the transverse portions form a substantially solid rectangular mass, a circuit component is provided that has a rectangular recess dimensioned to receive the rectangular mass, and the rectangular mass is bonded into the recess of the circuit component.

* * * * *